(12) United States Patent
Shimoyama

(10) Patent No.: US 7,793,134 B2
(45) Date of Patent: Sep. 7, 2010

(54) INFORMATION PROCESSING APPARATUS WORKING AT VARIABLE OPERATING FREQUENCY

(75) Inventor: Takeshi Shimoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/943,092

(22) Filed: Nov. 20, 2007

(65) Prior Publication Data

US 2008/0075214 A1 Mar. 27, 2008

Related U.S. Application Data

(63) Continuation of application No. 10/526,048, filed as application No. PCT/JP03/12824 on Oct. 7, 2003, now Pat. No. 7,437,592.

(30) Foreign Application Priority Data

Oct. 18, 2002 (JP) .............................. 2002-304533

(51) Int. Cl.
*G06F 1/00* (2006.01)
(52) U.S. Cl. ...................... 713/500; 713/501; 713/600; 711/100
(58) Field of Classification Search ................. 713/500, 713/501, 600; 711/100
See application file for complete search history.

(56) References Cited

U.S. PATENT DOCUMENTS

| | | |
|---|---|---|
| 5,598,556 A | 1/1997 | Ghosh et al. |
| 5,808,961 A | 9/1998 | Sawada |
| 5,815,462 A | 9/1998 | Konishi et al. |
| 5,826,092 A | 10/1998 | Flannery |
| 6,144,617 A | 11/2000 | Takai |
| 6,438,670 B1 | 8/2002 | McClannahan |
| 6,563,359 B2 * | 5/2003 | Kitagawa et al. ............ 327/291 |
| 6,587,920 B2 * | 7/2003 | Mekhiel ...................... 711/118 |
| 6,892,279 B2 * | 5/2005 | Mekhiel ...................... 711/118 |
| 7,127,626 B2 * | 10/2006 | Inaba .......................... 713/322 |
| 2002/0095559 A1 * | 7/2002 | Mekhiel ...................... 711/168 |
| 2004/0139362 A1 * | 7/2004 | Inaba .......................... 713/322 |

FOREIGN PATENT DOCUMENTS

| | | |
|---|---|---|
| JP | 2-259952 | 10/1990 |
| JP | 2-259954 | 10/1990 |
| JP | 02259954 | 10/1990 |

(Continued)

*Primary Examiner*—Thomas Lee
*Assistant Examiner*—Jaweed A Abbaszadeh
(74) *Attorney, Agent, or Firm*—Oblon, Spivak, McClelland, Maier & Neustadt, L.L.P.

(57) ABSTRACT

An information processing apparatus includes a clock signal generator unit that generates a clock signal which is variable in frequency. The information processing apparatus also includes a timing information calculator unit that calculates timing information corresponding to frequency information about the clock signal and acquires the frequency information before a variation in the clock signal. The information processing apparatus further includes an information processor unit that executes an information processing operation for a memory at an execution timing which is controlled by the timing information. The clock signal is supplied to the information processor unit as an operating clock signal. The timing information calculator unit determines whether an address of the memory of a previous information processing operation matches with an address of the memory of the information processing operation to produce a determination result and calculates the timing information based on the determination result.

14 Claims, 10 Drawing Sheets

FOREIGN PATENT DOCUMENTS

| | | |
|---|---|---|
| JP | 6-19776 | 1/1994 |
| JP | 7-160571 | 6/1995 |
| JP | 8-297606 | 11/1996 |
| JP | 9-319651 | 12/1997 |
| JP | 11-085684 | 3/1999 |
| JP | 11-85684 | 3/1999 |
| JP | 2000-285071 | 10/2000 |
| JP | 2000285071 | 10/2000 |
| JP | 2002-183110 | 6/2002 |
| JP | 2002-526861 | 8/2002 |
| WO | 00/20978 | 4/2000 |
| WO | WO 00/20955 | 4/2000 |

* cited by examiner

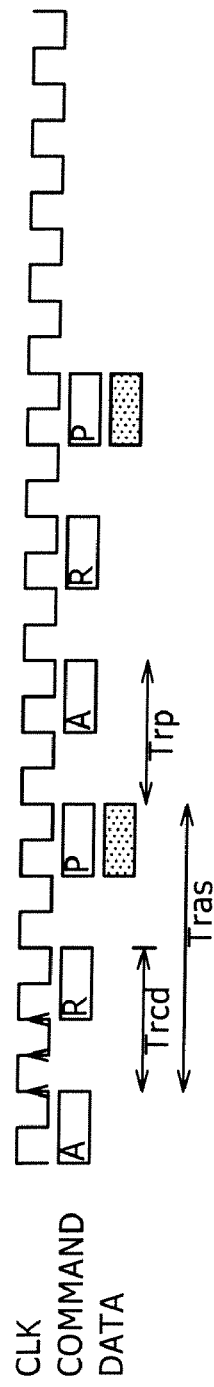
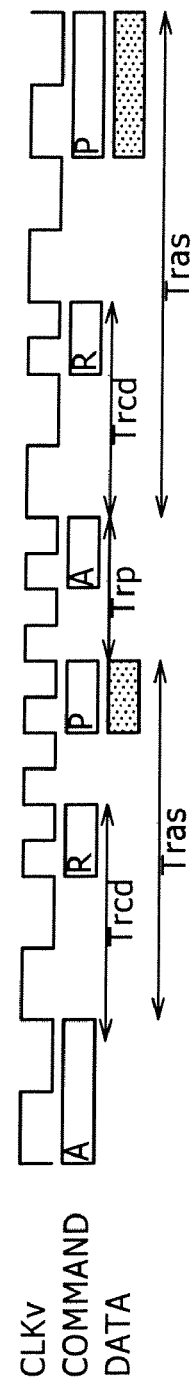
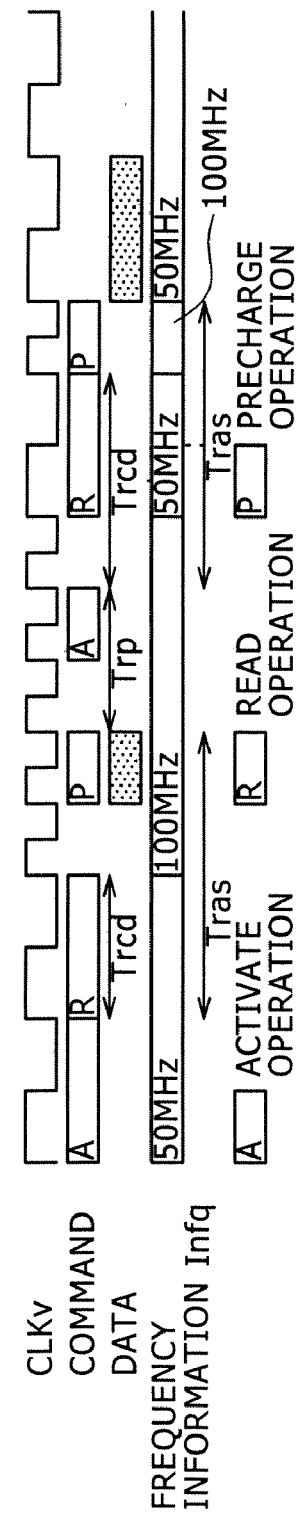

FIG.4A

| infq [1:0] | CLKv |
|---|---|
| 00 | 10MHZ |
| 01 | 33MHZ |
| 10 | 50MHZ |
| 11 | 100MHZ |

FIG.4B

| infq [3:0] | CLKv |
|---|---|
| 10 | 10MHZ |
| 3 | 33MHZ |
| 2 | 50MHZ |
| 1 | 100MHZ |

FIG. 6

| COMMAND | OPERATION | CS | RAS | CAS | WE | ROW ADDRESS | BANK | COLUMN ADDRESS |
|---------|-----------|----|----|-----|----|-----|------|-----|
| DESL | DESELECT | H | X | X | X | X | X | X |
| NOP | NO OPERATION | L | H | H | H | X | X | X |
| READ | READ | L | H | L | H | X | V | V |
| WRITE | WRITE | L | H | L | L | X | V | V |
| ACT | ACTIVATE | L | L | H | H | V | V | X |
| PRE | PRECHARGE | L | L | H | L | X | V | X |
| PALL | PRECHARGE ALL BANKS | L | L | H | L | X | X | X |
| REF | REFRESH | L | L | L | H | X | X | X |
| MRS | MODE SET | L | L | L | L | * | * | * |
| BST | BURST STOP | L | H | H | L | X | X | X |

SYMBOL  MEANING
L       0
H       1
X       ANY VALUE
V       VALID (V + MAY MEAN CASES WHERE TWOFOLD INFORMATION IS NEEDED)
*       PARTIALLY VALID

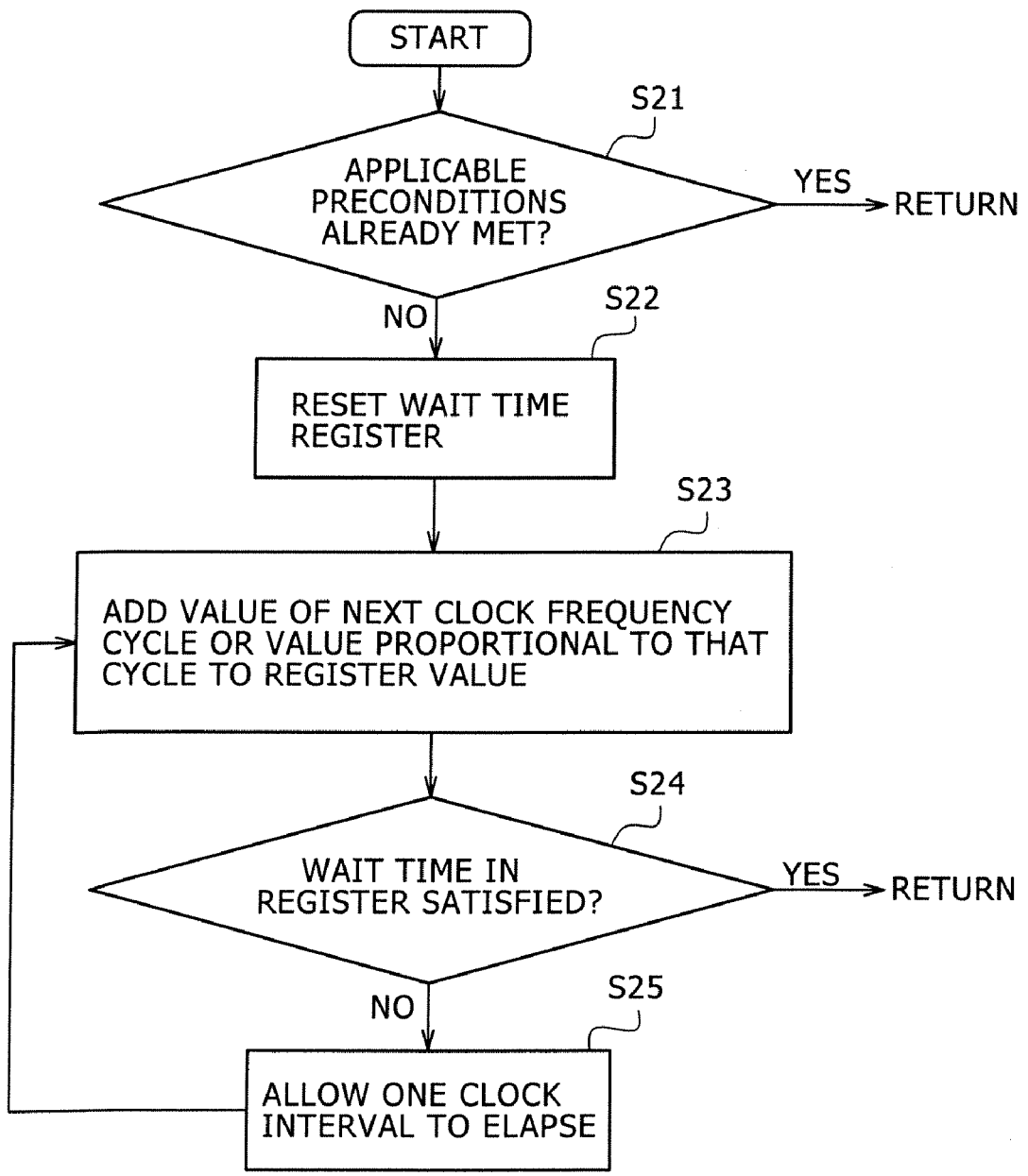

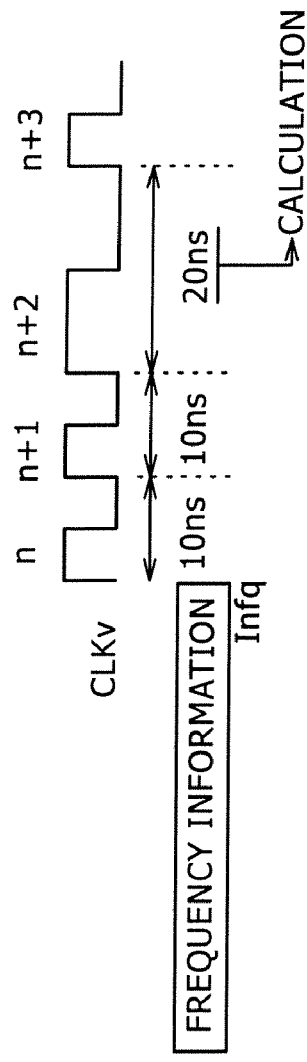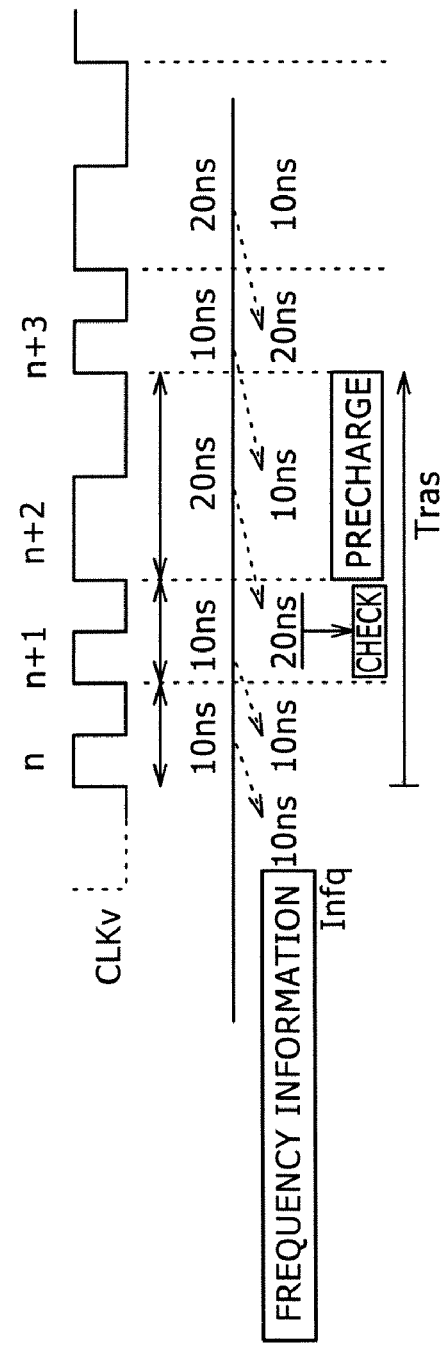
FIG. 10A
FIG. 10B

INFORMATION PROCESSING APPARATUS WORKING AT VARIABLE OPERATING FREQUENCY

INCORPORATION BY REFERENCE

The present application is a continuation of application Ser. No. 10/526,048, filed on Feb. 28, 2005, which is the national stage of PCT/JP03/12824, filed on Oct. 7, 2003, and which claims priority to Japanese Application No. JP 2002-304533, filed on Oct. 18, 2002, the entire contents of each of which is incorporated herein by reference.

TECHNICAL FIELD

The present invention relates to an information processing apparatus and an information storing apparatus such as memories or other devices operating on a predetermined synchronizing clock signal being supplied, as well as an information processing method and an information processing program for use with such apparatuses. More particularly, the invention relates to an information processing apparatus, an information storing apparatus, an information processing method, and an information processing program for implementing optimal signal processing operations when the synchronizing clock signal in use is varied in frequency.

BACKGROUND ART

Recent years have witnessed widespread use of electronic devices such as personal computers and PDAs (personal digital assistants) containing a plurality of LSIs (large-scale integrated circuits) in their system configuration. The signals used by these LSIs are input, output, and processed using synchronizing clock signals. Generally, a device that operates on a synchronizing clock signal is structured so that the speed of its performance is proportional to the frequency of the clock signal. Typical devices operating on the synchronizing clock signal include CPUs (Central Processing Units), memories, and north bridges.

Also known today are devices acting on variable, not fixed operating frequencies. Many electronic devices such as personal computers, PDAs and cellular phones are designed to operate only as needed. In more and more systems, their operating frequency is lowered in standby mode or in sleep mode in order to attain a reduced level of power dissipation; when a call is being made or moving picture signals are being processed, the operating frequency is raised to accelerate the processing of the systems. (One such system is disclosed illustratively in Japanese Patent Laid-open No. 2000-163965.)

These systems with their operating frequencies made variable usually have their functional parts divided in two regions. One region for which the operating frequency must remain fixed is isolated from the other region fed with a clock signal at variable frequencies. This structure is intended to prevent the region of the parts operating at variable frequencies from adversely affecting the other region of fixed-frequency parts.

Meanwhile, the information processing apparatuses using a synchronizing signal at varied frequencies are required to provide steady performance regardless of their synchronizing signal being fixed or variable. Generally, if an apparatus is guaranteed to operate at a high frequency, i.e., at short clock intervals, the apparatus will also operate at reduced frequencies but the performance of its signal processing will be lowered in proportion to the drop in frequency. Although the dissipation of power is curtailed by simply reducing the operating speed in keeping with the lowered clock frequency, that is not an optimally controlled operating state. A more sophisticated control scheme has been called for.

The present invention has been made in view of the aforementioned technical problems and provides an information processing apparatus, an information storing apparatus, an information processing method, and an information processing program for implementing an optimal signal processing setup that ensures steady performance using variable operating frequencies.

DISCLOSURE OF INVENTION

In solving the foregoing and other technical problems and according to one aspect of the invention, there is provided an information processing apparatus including: frequency information inputting means for inputting frequency information about a synchronizing clock signal having a clock frequency which is variable; time parameter storing means for storing a time parameter needed by an information processing section to operate for information processing; comparing means for comparing a time period based on a first clock frequency input through the frequency information inputting means, with the time stored in the parameter storing means; time setting means for setting a time period based on a second clock frequency replacing the time period based on the first clock frequency if the time period is not found to meet the time designated by the time parameter upon comparison by the comparing means; and operation controlling means which is supplied with the synchronizing clock signal as an operating clock signal and which operates to control the information processing section in suitably timed relation with the time period calculated from the clock frequency.

Where the information processing apparatus above of the invention is in use, the frequency information inputting means of the apparatus admits frequency information about a synchronizing clock signal having a variable frequency and carries out such operations as adding up the frequency information or decoding the frequency information in encoded form. The information processing section of the apparatus performs information processing in accordance with the result of such operations. Having acquired the frequency information, the information processing section can proceed with its processing in optimal fashion in a manner eliminating wasteful latency times.

According to another aspect of the invention, there is provided an information storing apparatus including: frequency information inputting means for inputting frequency information about a synchronizing clock signal having a clock frequency which is variable; time parameter storing means for storing a time parameter needed by an information processing section to operate for information processing; comparing means for comparing a time period based on a first clock frequency input through the frequency information inputting means, with the time stored in the parameter storing means; time setting means for setting a time period based on a second clock frequency replacing the time period based on the first clock frequency if the time period is not found to meet the time designated by the time parameter upon comparison by the comparing means; and information storing means which is supplied with the synchronizing clock signal as an operating clock signal and which performs an information storing operation in suitably timed relation with the time period calculated from the clock frequency.

Where the information storing apparatus above of the invention is in use, the frequency information inputting means of the apparatus similarly admits frequency information about a synchronizing clock signal having a variable frequency and carries out such operations as adding up the frequency information or decoding the frequency information in encoded form. The result of such operations is used by the inventive information storing apparatus as the basis for optimally storing information also in a manner eliminating wasteful latency times.

BRIEF DESCRIPTION OF DRAWINGS

FIGS. 2A, 2B and 2C are timing charts in effect when a memory device is in operation, FIG. 2A showing how the device is timed to operate on a fixed-frequency clock signal, FIG. 2B depicting how the device operates in fixedly timed fashion on a variable clock frequency signal, FIG. 2C illustrating how the device operates in properly timed relation with results from calculations of frequency information.

FIGS. 4A and 4B are tabular views showing examples of how frequency information is encoded, FIG. 4A showing an example in which the information is encoded in two bits, FIG. 4B illustrating an example in which the information is encoded using cyclically proportional values.

FIG. 6 is a tabular view constituting a table of signal-to-command correspondence applicable to the SDRAM in FIG. 5.

FIG. 9 is a flowchart of steps constituting a subroutine as part of the inventive information processing method, the subroutine calculating a wait time based on frequency information.

FIGS. 10A and 10B are timing charts applicable to another information processing method according to the invention and for use with the inventive information processing apparatus.

BEST MODE FOR CARRYING OUT THE INVENTION

Figure 1:
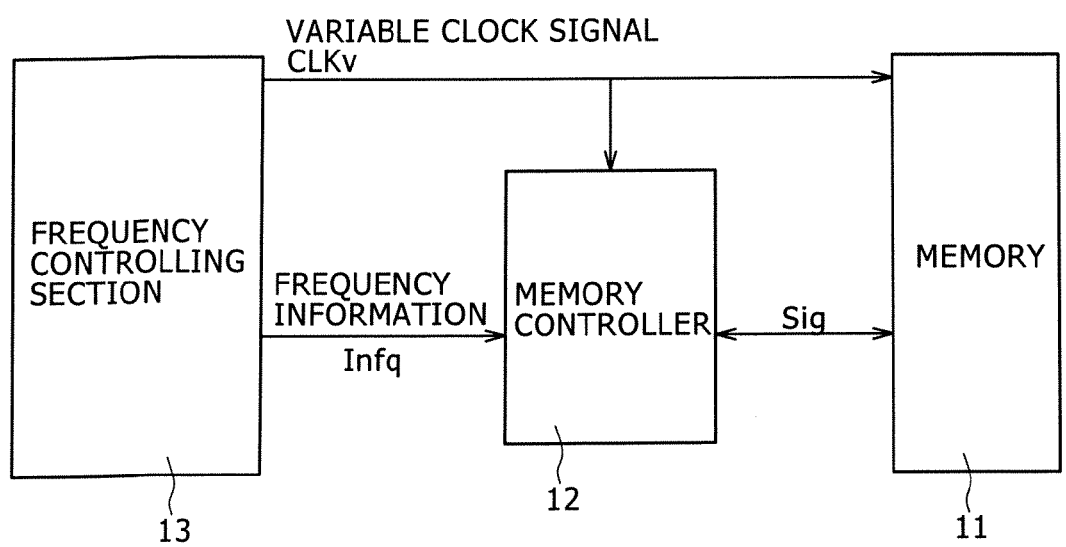
FIG. 1 is a block diagram of an information processing apparatus embodying this invention.

A memory device practiced as an information storing apparatus for use with an information processing apparatus according to the invention will now be described with reference to the accompanying drawings. The memory device embodying the invention primarily includes a memory 11 made of an SDRAM (Synchronous Dynamic Random Access Memory), a memory controller 12 for controlling the memory 11, and a frequency controlling section 13 for outputting frequency information Infq.

The memory 11 of this embodiment is an SDRAM which, given a read start address, outputs data in synchronism with a clock signal CLKv at a relatively high speed. The clock signal CLKv for this embodiment is variable in frequency. Illustratively, clock frequencies such as 10 MHz, 33 MHz, 50 MHz, 100 MHz and 133 MHz are switched over in keeping with the state of the information processing apparatus or of an electronic device in which this information processing apparatus is installed. The variable clock signal CLKv may alternatively be a so-called base clock, i.e., a clock signal external to the CPU of the system, or a clock signal generated solely for control of the memory 11. The variable clock signal CLKv is output by the frequency controlling section 13. Alternatively, the clock signal CLKv may be supplied directly from a separately furnished frequency generation circuit. The memory 11, to be described later in structural terms, may be formed by a two-chip arrangement in which the memory 11 and the memory controller 12 are mounted on a different chip each. The memory 11 may be furnished as a memory core and included in the same chip as the memory controller 12. The memory 11 is supplied with the variable clock signal CLKv as well as with a control signal Sig from the memory controller 12. Furthermore, signal lines, not shown, which carry a row address, a column address and data being input and output are connected to the memory 11. Although the memory 11 of this embodiment is an SDRAM, this is not limitative of the invention. Alternatively, although the memory 11 is a synchronous DRAM, it may be an ordinary DRAM, a first-page DRAM, an EDODRAM (Extended Data Out Dynamic Random Access Memory), a DDRSDRAM (Double Data Rate Synchronous Dynamic Random Access Memory), or a DRDRAM (Direct Rambus Dynamic Random Access Memory). The memory 11 is not limited to the DRAM category; it may be an SRAM (Static Random Access Memory), a ROM (Read-Only Memory), or a flash memory. The memory device or information processing apparatus including the memory according to this invention may be a microcomputer or some other signal processing chip incorporating a memory unit.

The memory controller 12 is a device that outputs the control signal Sig for controlling the memory 11 in operation. The control signal Sig generically refers to a group of signals including CS (chip select), RAS (row address strobe), CAS (column address strobe), WE (write enable), and CKE. The memory controller 12 is also supplied with the variable clock signal CLKv and synchronizes the control signal Sig with the supplied clock signal CLKV in output timing. In addition, the memory controller 12 admits frequency information Infq from the frequency controlling section 13 that includes frequency information about the clock signal CLKv. The frequency information Infq may be information about the current clock signal CLKv or may be information about a temporally ensuing clock signal CLKv. The frequency information Infq is typically provided in encoded form. An example of the coding will be discussed later. Alternatively the frequency information Infq may be information about the variable clock signal CLKv itself or about a linearly transformed variation of the signal. The memory controller 12 performs its operation by use of the input frequency information Infq, optimally controlling the memory 11 in a manner reflecting the result of the operation as will be discussed later.

The frequency controlling section 13 is a circuit that outputs the frequency information Infq. With this embodiment, the frequency controlling section 13 also outputs the variable clock signal CLKv. The frequency controlling section 13 is so structured as to vary the generated clock signal CLKv in frequency in response to commands from the CPU. Illustratively, the frequency controlling section 13 can reduce its operating clock frequency in soft off mode, standby mode, or sleep mode in order to lower the level of power dissipation. The frequency controlling section 13 may be in the same chip as the memory 11 or as the controller 12, or may be furnished in a separate chip.

FIGS. 2A, 2B and 2C are timing charts in effect when the memory device of this embodiment is in operation. FIG. 2A shows how a read operation is performed on the memory 11 using a clock signal fixed at a frequency of 100 MHz. FIG. 2B depicts by way of comparison how the read operation on the memory 11 is carried out in fixedly timed fashion on a variable clock frequency signal. FIG. 2C illustrates how the same read operation is executed in suitably timed relation with results from calculations of frequency information. Throughout the three timing charts, the symbol CLK stands for a fixed clock signal and CLKv for a variable clock signal. In the command signal part, reference character "A" stands for the period in which an activate operation command is issued, "R" for the period in which a read operation command is issued, and "P" for the period in which a precharge operation command is issued.

Control over an SDRAM generally involves a number of parameters: Tras (RAS activate time) denoting the time period ranging from an activate operation to a precharge operation, Trcd (RAS-CAS delay time) representing the time period from an activate operation to a read operation, and Trp (precharge time) indicating the time period from a precharge operation to an activate operation. To issue any one of the above commands requires at least waiting for the corresponding time period to elapse. In case of a failure to observe the time period, the corresponding memory operation can become unpredictable.

Before operations by this embodiment in keeping with a clock signal of a variable frequency are explained, a brief description will be made of a case where the clock signal has a fixed frequency for comparison. As long as the operating clock signal is fixed at a predetermined frequency, optimization of the operations is relatively easy. That is, if an operation is made using the clock signal fixed at the frequency of 100 MHz as shown in FIG. 2A, the time parameters {Tras, Trcd, Trp} for this SDRAM are {40 ns, 20 ns, 20 ns}; if the CAS latency is 2, then the RAS activate time Tras is 4 clock intervals long, RAS-CAS delay time Trcd is 2, clock intervals long, and the precharge time Trp is 2 clock intervals long in latency. With these parameters in place, the operations are optimized at the fixed frequency of 100 MHz.

By contrast, when the operating clock signal is varied in frequency with the fixed-frequency control setup still in place, latency times occur in low frequency regions where each clock interval is prolonged. These latency times, when added up, can worsen the overall performance of the device. As shown in FIG. 2B, the first RAS activate time Tras with a leading edge at which the "A" command is issued remains four clock intervals long. Because the setup of FIG. 2B applies to a clock frequency of 50 MHz, half of the initial 100 MHz, the RAS activate time Tras is in fact 2 clock intervals longer than if the frequency of 100 MHz is in effect, with the necessary wait time having already elapsed. The RAS activate time Tras for the next activate operation ("A") is 3 clock intervals longer than if the frequency of 100 MHz is in use. In like manner, the RAS-CAS delay time Trcd and the precharge time Trp involve prolonged latency times depending on the changes in the operating clock frequency.

The memory device of this embodiment performs its operation properly using the frequency information Infq when the operating clock signal is varied in frequency. As indicated in FIG. 2C, the signal processing is carried out in keeping with the frequency being used. The memory controller 12 is fed with the frequency information Infq from the frequency controlling section 13 as shown in FIG. 1. Given the frequency information Infq, the memory controller 12 calculates the clock signal period accordingly. If any command is found likely to be delayed when issued, the memory controller 12 causes the command in question to be issued earlier than usual for the memory 11 so that the latency time involved will be minimal. More specifically, as shown in FIG. 2C, the memory controller 12 receives from the frequency controlling section 13 the frequency information Infq saying that the clock frequency is 50 MHz after the activate operation ("A") command is issued. The information is received at least one clock interval earlier than the time at which a read ("R") command is to be issued. Based on the received frequency information Infq, a clock pulse is first generated to give the timing for issuing the activate operation ("A") command, followed immediately by a clock pulse to give the timing for issuing the next read operation ("R") command. If the memory device of this embodiment were not used, the pulse to give the timing for issuing the read operation ("R") command would be 1 clock interval apart from the preceding interval as shown in FIG. 2A or 2B. With the memory device of this embodiment, by contrast, the memory controller 12 having received the frequency information Infq beforehand from the frequency controlling section 13 recognizes that the necessary operations are guaranteed even if pulses are generated consecutively to give the timing for issuing the activate operation ("A") command and the next read operation ("R") command. This allows the memory controller 12 optimally to control the memory 11 so that wasteful latency times are eliminated and overall performance is enhanced.

The memory controller 12 can issue the read operation ("R") command on the condition that the RAS-CAS delay time Trcd be met. The RAS-CAS delay time is a necessary wait time based on the frequency information Infq at least for the period from the time the issuance of the activate operation ("A") command has ended until the issuance of the next read operation ("R") command has ended. With the clock frequency assumed to be 100 MHz during issuance of the read operation ("R") command, the memory controller 12 can issue the read operation ("R") command on the condition that the RAS-CAS delay time Trcd as the required wait time be met, on the basis of the frequency information Infq in effect until the read operation ("R") command is issued.

Likewise, the memory controller 12 based on the frequency information Infq issues the activate operation ("A") command and precharge operation ("P") command in such a manner that the necessary wait time is met and that the precharge time Trp and the RAS activate time Tras are optimally shortened.

What follows is a more detailed description of how the memory controller 12 recognizes beforehand that the necessary operations are guaranteed. In the setup of FIG. 2C, the second clock pulse is recognized to be 50 MHz and the clock interval is calculated at 20 ns based on the frequency information Infq. The RAS-CAS delay time Trcd here is 20 ns for this SDRAM, so that the clock period of 20 ns is satisfactory. Thus the memory controller 12 generates clock pulses consecutively to give the timing for issuing the activate operation ("A") command and the next read operation ("R") command. The successive issuance of the commands minimizes latency times and contributes to speeding up overall performance.

Figure 3A:
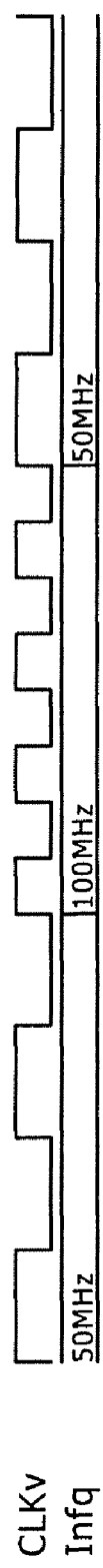
FIGS. 3A and 3B are timing charts indicating examples of frequency information being used, FIG. 3A showing an example in which the frequency information denotes the frequency of a current operating clock signal CLKv, FIG. 3B depicting an example in which the frequency information is indexed to the frequency of the next clock interval preceding changes in the frequency of the operating clock signal CLKv.

Referring to FIGS. 3A through 4B, the frequency information Infq will now be described in more detail. Illustratively, the frequency information Infq may be data bits indexed to the frequency of the variable clock signal CLKv. The frequency information Infq may be indexed to the current frequency of the operating clock signal CLKv as shown in FIG. 3A, or to the next clock interval preceding changes in the frequency of the operating clock signal CLKv as depicted in FIG. 3B. The frequency information Infq may alternatively be indexed solely to the points of change in the frequency, not shown. As another alternative, the frequency information Infq may be indexed not only to the next clock frequency but also to the frequency occurring a predetermined plurality of clock intervals later than usual.

The clock frequency is indexed illustratively by decoding the frequency information Infq in encoded form. FIGS. 4A and 4B show two encoding methods in tabular form, which are only examples and not limitative of the invention. The encoding method of FIG. 4A involves assigning two-bit data to each of the variable frequencies of the clock signal CLKv. In this example, data {00} is assigned to the frequency of 10 MHz, data {01} to the frequency of 33 MHz, {10} to 50 MHz, and {11} to 100 MHz. According to this encoding method, the data length remains 2 bits even when the clock signal frequency is changed from 10 MHz to 100 MHz, i.e., a tenfold increase in frequency. This means that complicated processing steps for circuit arrangements are not needed for decoding the data.

The encoding method of FIG. 4B involves assigning to the variable clock signal CLKv the reciprocal of each of its varied frequencies. The reciprocal of a frequency of the clock signal CLKv corresponds to a single clock interval for that frequency. In this example, data {10} is assigned to the frequency of 10 MHz for the clock signal CLKv, data {3} to the frequency of 33 MHz, {2} to 50 MHz, and {1} to 100 MHz. Since each value of these data items corresponds by itself to the single clock interval, wait times are determined by simple multiplications. That is, when the frequencies of the clock signal CLKv are 10 MHz, 33 MHz, 50 MHz, and 100 MHz, the clock periods are 100 ns, 30 ns, 20 ns, and 10 ns, respectively. The periods are easy to determine through multiplication of the respective data values by 10 ns.

Figure 5:
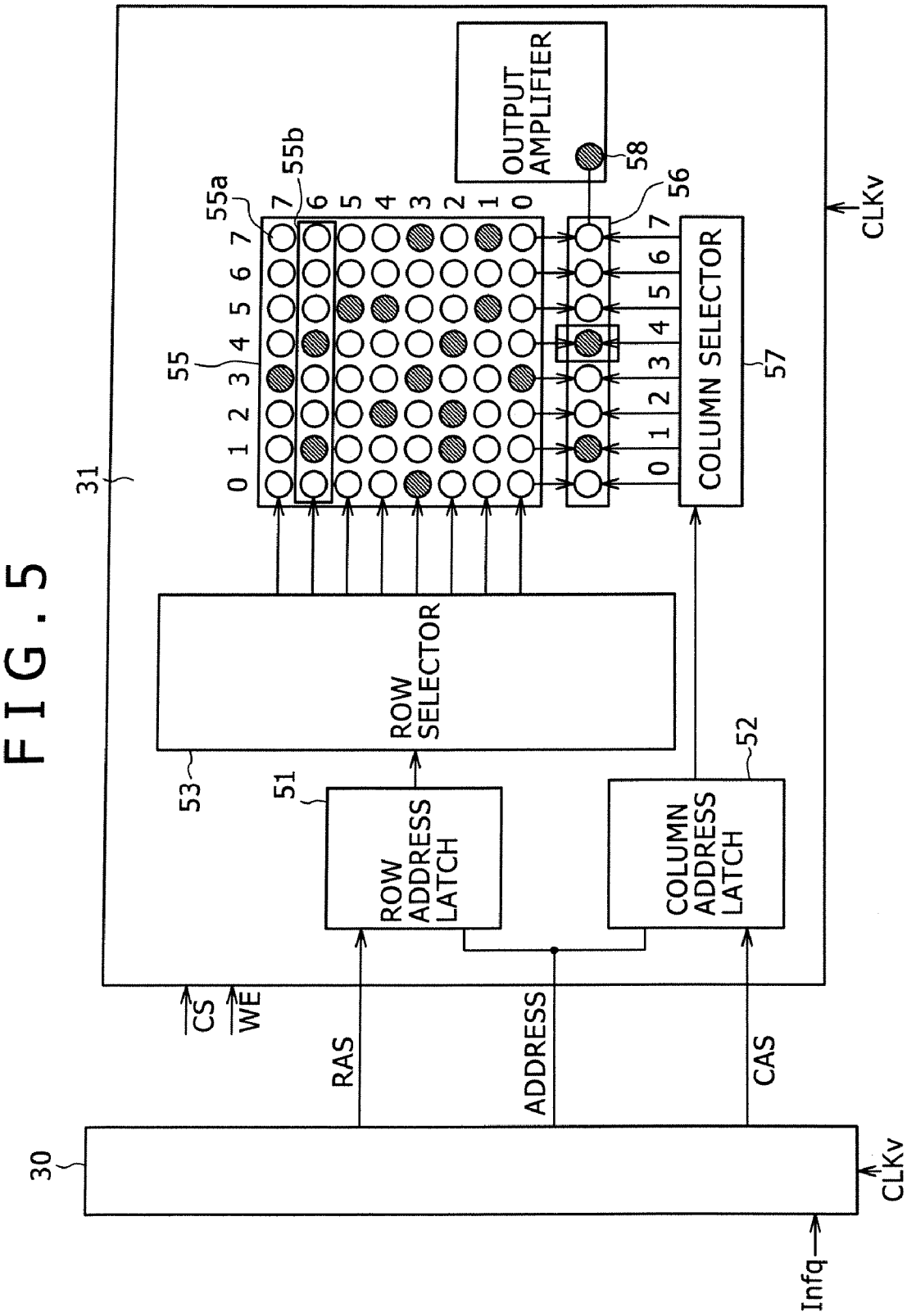
FIG. 5 is a block diagram of an information processing apparatus built to embody the invention by use of a memory controller and an SDRAM.

Referring now to FIGS. 5 and 6, the memory device of this embodiment is described below in more detail. FIG. 5 shows a memory controller 30 and a memory unit 31. With this embodiment, the memory controller 30 is supplied with the frequency information Infq and operates in optimal fashion when the operating clock signal is varied in frequency.

The memory controller 30 first receives the frequency information Infq from the frequency controlling section as described above in order to issue commands in a suitably timed manner. FIG. 6 is a typical signal-to-command correspondence table for use with this memory device. In the table, bar symbols are omitted for simplification. When the CS (chip select) signal is brought "L" ("Low" level), the memory unit 31 is selected. As mentioned above, the activate operation ("A") command, read operation ("R") command, and precharge operation ("P") command are each formed by suitably combining the control signals RAS (row address strobe), CAS (column address strobe), and WE (write enable). More specifically, the activate operation command is formed by driving the RAS signal Low, the CAS signal High, and the WE signal High; the read operation command is formed by bringing the RAS signal High, the CAS signal Low, and the WE signal High; the write operation command is formed by driving the RAS signal High, the CAS signal Low, and the WE signal Low; and the precharge operation command is formed by bringing the RAS signal Low, the CAS signal High, and the WE signal Low. Suppose now that with the clock signal CLKv varied in frequency as described above, the activate operation command and the read operation command are issued consecutively as indicated by the second clock interval in FIG. 2C. In such a case, all that needs to be done is to drive the RAS signal from Low to High and the CAS signal from High to Low. The signal level shifts are carried out through calculations based on the frequency information Infq from the frequency controlling section.

The memory unit 31 is made up of a memory bank 55, a sense amplifier 56 for amplifying the electrical charges in each of the cells in the memory bank 55, and other peripheral circuits. The memory bank 55 is a part that actually accommodates data and is constituted by a plurality of cells 55a. Each cell 55a is a capacitor in structure and, depending on the data to be stored therein, is either charged or discharged electrically. Data is stored in the memory bank 55 in the form of charged patterns constructed by the cells 55a. In this example, eight by eight cells 55a are provided in a single memory bank 55. Needless to say, the number of cells 55a may be larger or smaller than that as needed.

The group of cells 55a on each row of the cells in the memory bank 55 is specifically called a page 55b. When supplied with a refresh signal from a refresh timing generator of a refresh control circuit, not shown, or with a read signal from a row selector 53, the memory bank 55 transfers to the sense amplifier 56 the electrical charges from each of the cells 55a in a unit of the pages 55b corresponding to the rows to which the signal in question is applied. In FIG. 3, the numbers (0 to 7) marked vertically and horizontally around the memory bank 55 indicate the rows in the vertical direction and the columns in the horizontal direction.

The sense amplifier 56 receives the data transferred from the cells 55a on the page 55b designated by the row selector 53, amplifies the data up to a predetermined potential level, and sends the amplified data back to the originating page 55b. If, with the cells being charged, a read signal is input from a column selector 57 designating a column of cells, then the sense amplifier 56 reads the data from the designated column and outputs the retrieved data to an output amplifier 58.

In FIG. 5, the sense amplifier 56 is so structured as to amplify only the electrical charge in the cells 55a of one page 55b at a time. This structure permits refresh or read processing only on a page-by-page basis. For this reason, the CPU, not shown, provides control so that the refresh signal generated by the self-refresh timing generator or the read signal generated by the row selector 53 is timed to execute the corresponding operation on one row at a time. Alternatively, a plurality of sense amplifiers 56 may be provided to carry out refresh or read operations parallelly on a plurality of pages (i.e., rows).

A column address latch 52 is activated upon receipt of the CAS signal from the memory controller 30, outputting to the column selector 57 column address information pointing to the location of a column of cells 55a in the memory bank 55. Given the column information from the column address latch 52, the column selector 57 outputs to the sense amplifier 56 a data read signal corresponding to the designated column, and causes the sense amplifier 56 to output its data to the output amplifier 58. The output amplifier 58 amplifies the input electrical charge in order to output the retrieved data to the CPU through the memory controller 30.

Below is a description of how the memory controller 30 reads data from a desired cell 55a in the memory bank 55 under instructions from the CPU. Suppose that, given an instruction from the CPU, the memory controller 30 is to read data from the cell 55a on row 6, column 4 in the memory bank 55. That is, the CPU instructs the memory controller 30 to read data from the cell 55a on row 6, column 4 in the memory bank 55. In this case, upon receipt of the instruction, a control signal generating section of the memory controller 30 outputs first the RAS signal to a row address latch 51 and then corresponding address signals to both the row address latch 51 and the column address latch 52. On receiving the RAS signal from the control signal generating section, the row address latch 51 turns on its activity and outputs to the row selector 53 subsequently received row address information pointing to a specific row. In this case, the information "row 6" is output to the row selector 53.

Based on the row information coming from the row address latch 51, the row selector 53 outputs a read signal that transfers to the sense amplifier 56 the electrical charge of the row of cells 55a in the corresponding page 55b. In this case, the sense amplifier 56 receives the output electrical charge of the cells 55a in the page 55a on row 6, shown enclosed by solid lines on the memory bank 55 in FIG. 5. In turn, the sense amplifier 56 amplifies the transferred electrical charge up to a predetermined potential level.

At this point, the control signal generating section outputs the CAS signal to the column address latch 52 while outputting address signals to both the row address latch 51 and the column address latch 52 at the same time. Upon receipt of the CAS signal from the control signal generating section, the column address latch 52 turns on its activity and outputs to the column selector 53 the subsequently received column address information pointing to a specific column. In this case, the information "column 4" is output to the column selector 57.

Based on the input column information, the column selector 57 outputs a read signal that transfers to the output amplifier 58 the electrical charge which corresponds to the column in question and which has been amplified by the sense amplifier 56. In this case, the sense amplifier 56 outputs to the output amplifier 58 the electrical charge of the cell 55a on column 4, shown enclosed by solid lines in FIG. 5. In turn, the output amplifier 58 amplifies the transferred electrical charge up to a predetermined potential level and outputs the resulting data to the CPU through the memory controller 30. Thereafter, the sense amplifier 56 returns the amplified electrical charge of the page 55b on row 6 to the original cells 55a in the memory bank 55. As a result, the eight cells 55a in the page 55b (on row 6 in this example) from which data has been read are now charged as before (i.e., fully charged).

Figure 7:
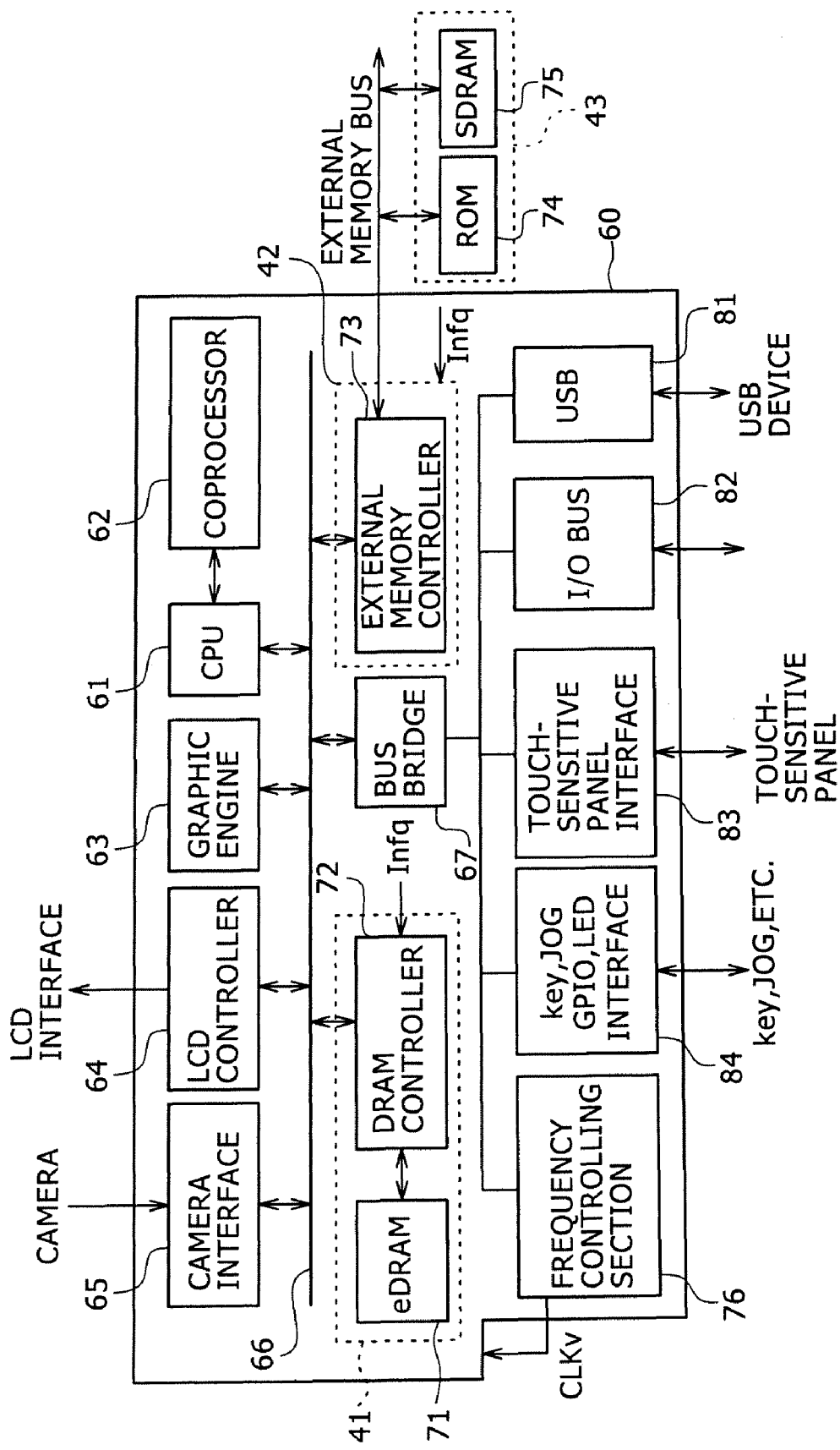
FIG. 7 is a block diagram of an information processing apparatus built to embody the invention by incorporating a memory controller and a memory into a PDA.

Referring to FIG. 7, a PDA (personal digital assistant) incorporating the memory device of this invention will now be described. The PDA has a PDA core 60 connected to a liquid crystal display and a touch-sensitive panel, neither shown. The PDA core 60 includes a CPU 61 and a coprocessor 62 for carrying out necessary information processing routines. The CPU 61 is connected to a bus line 66. Also connected to the bus line 66 are a bus bridge 67, a graphic engine 63, a camera interface 65, and an LCD (liquid crystal display) controller 64. The bus bridge 67 acts as a connector to low-speed circuit parts. The graphic engine 63 is designed to implement high-speed rendering. The camera interface 65 interfaces to a camera through which images are captured. The LCD controller 64 sends and receives signals to and from the LCD.

The bus bridge 67 is connected to a USB (universal serial bus) controller 81, an I/O bus 82 for I/O operations, a touch-sensitive panel interface 83, and an interface 84 for interfacing to a keyboard (key), a jog dial (JOG), a general-purpose I/O port (GPIO), and light-emitting diodes (LEDs). The bus bridge 67 is further connected to a frequency controlling section 76 that outputs the clock signal CLKv and frequency information Infq.

Also connected to the above-mentioned bus line 66 are an embedded DRAM (eDRAM) 71, a DRAM controller 72, and an external memory controller 73. The DRAM controller 72 is a circuit that sends control signals to the embedded DRAM 71. In this embodiment, the DRAM controller 72 is supplied with the frequency information Infq about the variable clock signal CLKv illustratively from the frequency controlling section 76. Using the frequency information Infq, the DRAM controller 72 performs necessary operations including decoding. As the clock signal CLKv is being varied in frequency, the DRAM controller 72 performs optimal processing of the embedded DRAM 71. The embedded DRAM 71 and DRAM controller 72 constitute a memory system 41 that operates at high speed with a minimum of latency times in accordance with the frequency information Infq.

The frequency information Infq about the clock signal CLKv can be supplied not only to the memory system 41 but also to the external memory controller 73. The external memory controller 73 is a circuit that sends control signals to a ROM 74 and an SDRAM 75 connected via an external memory bus. Using the frequency information Infq, the external memory controller 73 performs necessary operations including decoding. As the clock signal CLKv is being varied in frequency, the external memory controller 73 performs optimal processing of the ROM 74 and SDRAM 75 with a minimum of latency times. The external memory controller 73 makes up a controller unit 42, and the ROM 74 and SDRAM 75 constitute a memory unit 43. The controller unit 72 and the memory unit 43 in turn form a memory system that also operates at high speed as in the case of the memory system 41 above. Although the above-described structure was shown having both the DRAM controller 72 and the external memory controller 73 make use of the frequency information Infq to implement high-speed processing with a minimum of latency times, this is not limitative of the invention. Alternatively, only one of the two controllers may bring about the rapid processing using the frequency information Infq. The ROM 74 and SDRAM 75 used above in conjunction with the external memory control are merely examples; other memories or signal processing devices may be adopted instead. Furthermore, the same frequency information Infq may be fed to both the external memory controller 73 and the DRAM controller 72. Alternatively, the two controllers may each be supplied with frequency information Infq of a different kind if they utilize different clock signals.

Figure 8:
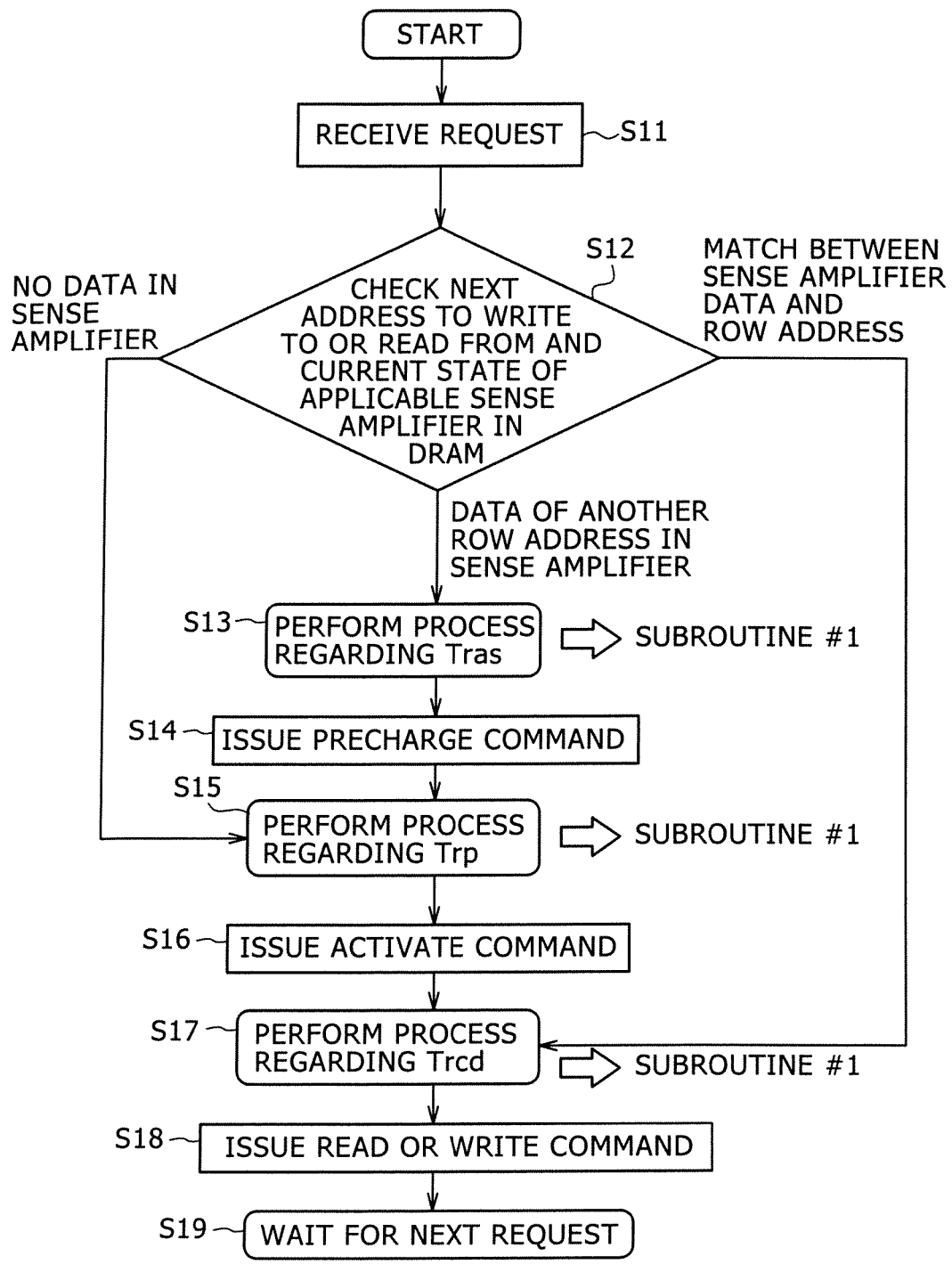
FIG. 8 is a flowchart of steps constituting an information processing method according to the invention, the steps being carried out by determining whether there is a match between data and an address in a sense amplifier for the SDRAM.

Described below with reference to FIGS. 8 and 9 are the steps constituting the preferred information processing method for use with the memory device of this embodiment. This information processing method represents illustratively the workings of memory controller hardware. Where the information processing apparatus of this invention is, say, a microcomputer or like equipment, a program representative of the method and furnished on a suitable medium may be read from there into the controller for execution.

Before the major flow of program execution is described with reference to FIG. 8, the flow of processing by subroutine #1 shown in FIG. 9 is discussed below. Once the subroutine #1 is started, a check is made in step S21 to determine whether or not relevant preconditions are already met. The relevant preconditions refer illustratively to restrictions that are applicable to and dependent on the performance of the memory in question. If the time parameters {Tras, Trcd, Trp} of the SDRAM are {40 ns, 20 ns, 20 ns}, then determine whether or not the times associated with the issuance of the commands involved have already elapsed. If the relevant preconditions are found to have met ("YES" in step S21), then control is returned from the subroutine #1 to the program routine of FIG. 8.

If in step S21 the preconditions are not found to meet ("NO"), step S22 is reached. In step S22, a wait time register is reset. After this, step S23 is reached in which the value of, say, the next clock frequency cycle or a value proportional to that cycle is added to the register by use of the frequency information Infq. The adding process provides a wait time register value reflecting the next clock frequency cycle. In step S24, a check is made to determine whether or not the value in the wait time register satisfies the wait time for issuing a command. If the value in the wait time register is found to meet the wait time for command issuance ("YES" in step S24), then control is returned from the subroutine #1 to the program routine of FIG. 8 as in step S21 above. If the wait time register value is not found to meet the wait time for issuing the command ("NO" in step S24), then step S25 is reached. In step S25, one clock interval is allowed to elapse. Following the wait time of the single clock interval, step S23 is reached again in which the value of, say, the current clock frequency cycle or a value proportional to that cycle is added to the wait time register, and the subsequent steps are repeated.

As described, some of the steps constituting the subroutine #1 in FIG. 9 compare the time parameters with the relevant preconditions for the memory device to be controlled. As long as the preconditions are met, signal processing is allowed to proceed without waiting for the next clock interval. This permits high-speed processing with a minimum of latency times. In step S23, the value of the current clock frequency cycle or a value proportional to that cycle is added to the wait time register through the use of the frequency information Infq as mentioned.

FIG. 8 shows the major flow of program execution by the controller. After the program is started, the controller receives a request from the CPU in step S11. In step S12, a check is made on the next address to write to or read from and on the current state of the applicable sense amplifier in the DRAM. A jump is made to a different process depending on the result of the check in step S12.

If in step S12 data designating another row address is found in the sense amplifier, step S13 is reached. In step S13, a process regarding the RAS activate time Tras is carried out by use of the subroutine #1 discussed above with reference to FIG. 9. The subroutine #1 of FIG. 9 is basically a waiting routine. Upon elapse of a necessary wait time, step S14 is reached in which a precharge operation command is issued. On receiving the precharge command, the DRAM causes the relevant memory cells to be charged with the data held in the sense amplifier.

With the precharge command issued, step S15 is reached. In step S15, a process regarding the precharge time Trp is carried out also by use of the subroutine #1 in FIG. 9. As mentioned, the subroutine #1 is a waiting routine, so that step S16 is reached upon elapse of the necessary wait time. In step S16, an activate operation command is issued. Upon receipt of the activate command, the DRAM reads data from the memory cells corresponding to the address and brings the data into the sense amplifier for amplification.

After the activate command is issued, step S17 is reached. In step S17, a process regarding the RAS-CAS delay time Trcd is carried out through the use of the subroutine #1 discussed above with reference to FIG. 9. The subroutine #1 is a waiting routine, so that step S18 is reached upon elapse of the necessary wait time. In step S18, a read or write operation command is issued. Upon receipt of the write or read command, the DRAM writes or reads data to or from those nodes of the sense amplifier which represent the memory cells corresponding to the address of interest. The resulting signal is read out of or written to the memory. Step S18 is followed by step S19 in which the next request is awaited.

If in step S12 data is not found in the sense amplifier, the precharge operation is not necessary. In that case, steps S13 and S14 (in which to issue the precharge command) are skipped. With no data in the sense amplifier, step S12 is followed by step S15. In step S15, the subroutine #1 is executed as a waiting routine for processing the precharge time Trp and the RAS-CAS delay time Trcd. Ultimately, step S19 is reached in which the next request is awaited as in the foregoing case where data representing another row address was found in the sense amplifier in step S12.

If in step S12 the row address of the data in the sense amplifier is found to match the row address of the data associated with the read or write operation in question, then both the precharge operation and the activate operation are unnecessary. In that case, steps S13 through S16 are skipped, i.e., the precharge command is not issued (in step S14), nor is the activate command (in step S16). Step S12 is thus followed by step S17 in which the process regarding the RAS-CAS delay time Trcd is carried out using the subroutine #1 as a waiting routine. Ultimately, step S19 is reached in which the next request is awaited as in the case above where data representing another row address was found in the sense amplifier in step S12.

As described, the information processing apparatus of this embodiment compares the address for the read or write operation of interest with the address of the data left in the sense amplifier. In the case of a match, the remaining data is used unchanged so that a high-speed read or write operation is effected. The timing for issuing commands is controlled using the waiting program shown in FIG. 9. The calculations to find the wait time are made using the frequency information Infq, whereby high-speed processing is implemented with a minimum of latency times. In other words, whereas operations can be carried out at high speed as described above, they are performed reliably at a lower clock rate if standby mode or sleep mode is in effect. That in turn contributes to lowering overall power dissipation appreciably. The series of steps and processes described above may be executed either by hardware or by software.

Although the embodiment above of the invention has been described primarily as the controller for controlling a memory or some other storage device in reading the frequency information Infq, this is not limitative of the invention. Alternatively, the embodiment may be used in conjunction with other signal processing devices or circuits supplied with a variable frequency clock signal. In such cases, the frequency information about the variable clock signal may be operated on to calculate necessary wait times, whereby the information processing of the circuit is optimized.

Figure 3B:
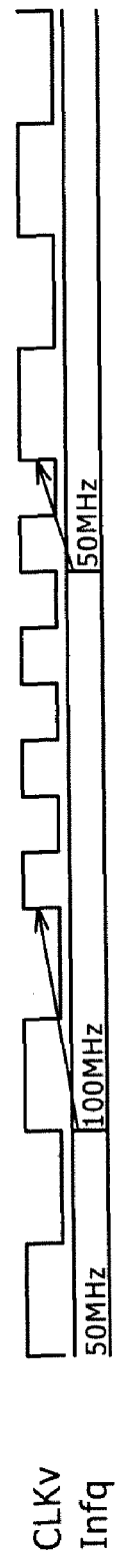

Whereas the foregoing embodiment was shown making wait time calculations and other processing based on the next clock frequency state, it might happen that frequency information about the frequency state a plurality of clock intervals later is acquired beforehand as shown in FIG. 3B. In that case, the wait time calculations may be performed in advance. Illustratively, as depicted in FIG. 10A, at the time of an n–th clock interval, frequency information about the (n+2)th clock interval (e.g., 20 ns) may be obtained. If that happens, the frequency information about the (n+2)th clock interval may be utilized for the calculations. In the flowcharts of FIGS. 8 and 9, the determination on the next clock interval is made one clock internal earlier using the current frequency information. Alternatively, the determination on the next clock interval but one (n+2) may be performed two clock intervals earlier using frequency information on the next clock interval (n+1). For example, as shown in FIG. 10B, a determination whether or not Tras (RAS activate time) is 40 ns can be made two clock intervals earlier (at the n-th clock) using frequency information about the next clock interval (n+1). As another alternative, the determination on the next clock interval may be carried out beforehand using frequency information about the next clock interval. As a further alternative, if a request effective (m−1; m is a natural number) clock intervals later is received and if frequency information about the (m−1)th clock interval is obtained beforehand, then a determination can be made a plurality of clock intervals earlier.

Furthermore, although the embodiment above was shown having the frequency controlling section for acquiring the frequency information Infq, this is not limitative of the invention. Alternatively, the frequency information Infq may be obtained directly from the CPU or a similar processing unit that outputs commands for causing the clock frequency to vary. The electronic devices that may incorporate the embodiment of the invention are not limited to PDAs and personal computers. The invention when suitably embodied can be used in diverse apparatuses: printers, facsimile machines, PC peripherals, telephone sets, television receivers, image display devices, communication equipment, cellular phones, cameras, radios, audio-video equipment, cooling fans, refrigerators, hair dryers, irons, teapots, vacuum cleaners, rice cookers, electromagnetic cooking devices, lighting fixtures, toys such as video game machines and radio-controlled cars, electrically-driven tools, medical equipment, measuring instruments, onboard devices for vehicles, office supplies, workout and cosmetic appliances, electronically-controlled robots, wearable electronic devices, various kinds of motor-driven equipment, transport machines for surface and airborne transportation, generating equipment for home and business uses, and other electronic apparatuses for diverse applications

INDUSTRIAL APPLICABILITY

The information processing apparatus according to this invention permits processing operations such as wait time calculations at the time of clock frequency changes based on frequency information Infq, whereby processing is implemented at a significantly enhanced speed with a minimum of latency times. In other words, whereas the operations are carried out rapidly, power dissipation can be reduced when standby mode or sleep mode is in effect. When applied to PDAs and PCs, the inventive information processing apparatus thus attains two major objectives: high-speed performance and low-power dissipation.

What is claimed is:

1. An information processing apparatus, comprising:
a clock signal generator unit configured to generate a clock signal which is variable in frequency;
a timing information calculator unit configured to calculate timing information corresponding to frequency information about said clock signal and to acquire said frequency information before a variation in said clock signal; and
an information processor unit configured to execute an information processing operation for a memory at an execution timing which is delayed by said timing information, wherein,
said clock signal is supplied to said information processor unit as an operating clock signal, and
said timing information calculator unit is configured to determine whether a portion of an address of said memory of a previous information processing operation matches with a portion of an address of said memory of the information processing operation to produce a determination result and to calculate said timing information based on the determination result.

2. The information processing apparatus of claim 1, wherein said information processor unit includes said memory.

3. The information processing apparatus of claim 1, wherein said frequency information is generated by coding said clock signal.

4. The information processing apparatus of claim 1, wherein the portion of the address of said memory of the previous information processing operation is a row address of said memory, and the portion of the address of said memory of the information processing operation is a row address of said memory.

5. The information processing apparatus of claim 1, wherein said timing information calculator unit is further configured to determine whether data is found in a sense amplifier to produce the determination result.

6. An information processing apparatus, comprising:
a clock signal generator unit configured to generate a clock signal which is variable in frequency;
an information processor unit configured to execute a plurality of information processing operations for a memory, the plurality of information processing operations having waiting times different from each other, said clock signal supplied to said information processor unit as an operating clock signal; and
a timing information calculator unit configured to calculate a waiting time for one of said plurality of information processing operations, corresponding to frequency information about said clock signal, and to acquire said frequency information before a variation in said clock signal wherein,
the calculated waiting time is used for a waiting operation for said one of said plurality of information processing operations in said information processor unit, and
said timing information calculator unit is configured to determine whether a portion of an address of said memory of a previous one of the plurality of information processing operations matches with a portion of an address of said one of said plurality of information processing operations to produce a determination result and to calculate said waiting time based on the determination result.

7. The information processing apparatus of claim 6, wherein said information processor unit includes said memory.

8. The information processing apparatus of claim 7, wherein said frequency information is generated by coding said clock signal.

9. An information processing apparatus, comprising:
a clock signal generator unit configured to generate a clock signal which is variable in frequency;
means for calculating timing information corresponding to frequency information about said clock signal and for acquiring said frequency information before a variation in said clock signal; and
means for executing an information processing operation for a memory at an execution timing which is delayed by said timing information, wherein,
said clock signal is supplied to said means for executing as an operating clock signal, and
said means for calculating determines whether a portion of an address of said memory of a previous information processing operation matches with a portion of an address of said memory of the information processing operation to produce a determination result and calculates said timing information based on the determination result.

10. The information processing apparatus of claim 9, wherein said means for executing includes said memory.

11. The information processing apparatus of claim 10, wherein said frequency information is generated by coding said clock signal.

12. An information processing apparatus, comprising:

a clock signal generator unit configured to generate a clock signal which is variable in frequency;

means for executing a plurality of information processing operations for a memory, the plurality of information processing operations having waiting times different from each other, said clock signal supplied to said means for executing as an operating clock signal; and means for calculating a waiting time for one of said plurality of information processing operations, corresponding to frequency information about said clock signal, and for acquiring said frequency information before a variation in said clock signal wherein, the calculated waiting time is used for a waiting operation for said one of said plurality of information processing operations in said means for executing, and said means for calculating determines whether a portion of an address of said memory of a previous one of the plurality of information processing operations matches with a portion of an address of said one of said plurality of information processing operations to produce a determination result and calculates said waiting time based on the determination result.

13. The information processing apparatus of claim 12, wherein said means for executing includes said memory.

14. The information processing apparatus of claim 13, wherein said frequency information is generated by coding said clock signal.

* * * * *